Oct. 22, 1963  P. E. JAQUISH, JR., ET AL  3,107,417
METHOD FOR ADJUSTING SETTING OF A PRESSURE RELIEF VALVE
Filed Aug. 24, 1959  4 Sheets-Sheet 1

INVENTORS
Paul E. Jaquish Jr., &
BY Robert P. Rohde
Bryce Beeler
ATTORNEY

Oct. 22, 1963 P. E. JAQUISH, JR., ET AL 3,107,417
METHOD FOR ADJUSTING SETTING OF A PRESSURE RELIEF VALVE
Filed Aug. 24, 1959 4 Sheets-Sheet 3

INVENTORS
Paul E. Jaquish Jr. &
BY Robert P. Rohde

Bruce Beecher
ATTORNEY

United States Patent Office 3,107,417
Patented Oct. 22, 1963

---

3,107,417
METHOD FOR ADJUSTING SETTING OF A PRESSURE RELIEF VALVE
Paul E. Jaquish, Jr., and Robert P. Rohde, Saginaw, Mich., assignors to General Motors Corporation, Detroit, Mich., a corporation of Delaware
Filed Aug. 24, 1959, Ser. No. 835,491
1 Claim. (Cl. 29—157.1)

This invention relates to an improved method of setting a relief valve.

A relief valve is a necessary component of substantially any hydraulic system, serving to provide a cut-off of the hydraulic power desirable either as a safety measure or to arrest the action of the motor means at a predetermined point. Such a valve conventionally comprises a housing for a ball element or the like which is disposed on a seat over a passage communicating with the system, the ball being held against the seat by a spring gauged to yield at a selected pressure. On opening of the valve, fluid exhausts therefrom through a passage in the valve housing having communication with the system reservoir. Heretofore it has been the practice to set the valve, i.e., preload the spring, through the use of a flanged plug which is threaded into the valve housing to the required extent, shims being employed to take up the excess space between the inner annular face of the plug flange and the housing. If these shims are omitted, the plug is prone to loosen with loss of the set, particularly where the valve is subject to vibratory forces.

The selection and installation of the shims is so time consuming that bottlenecks frequently occur at the station where such operation is carried out. While it might occur to one to employ in lieu of the shims a locking insert carried in the shank of the plug, this expedient is not applicable in many cases because of the small size of the plug or insufficient thread length.

As indicated, the present invention has as its principal object to provide a method for attaining the desired setting without the use of shims and in a manner reducing assembly time.

Figure 1:
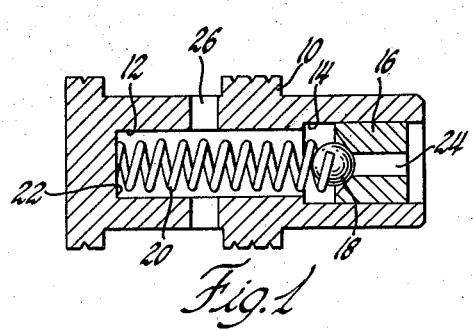
Figure 2:
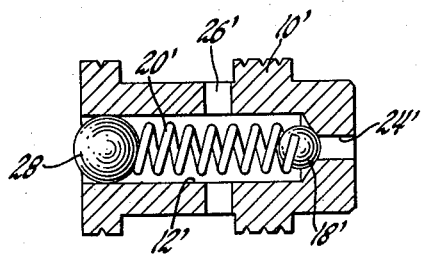
Figure 3:
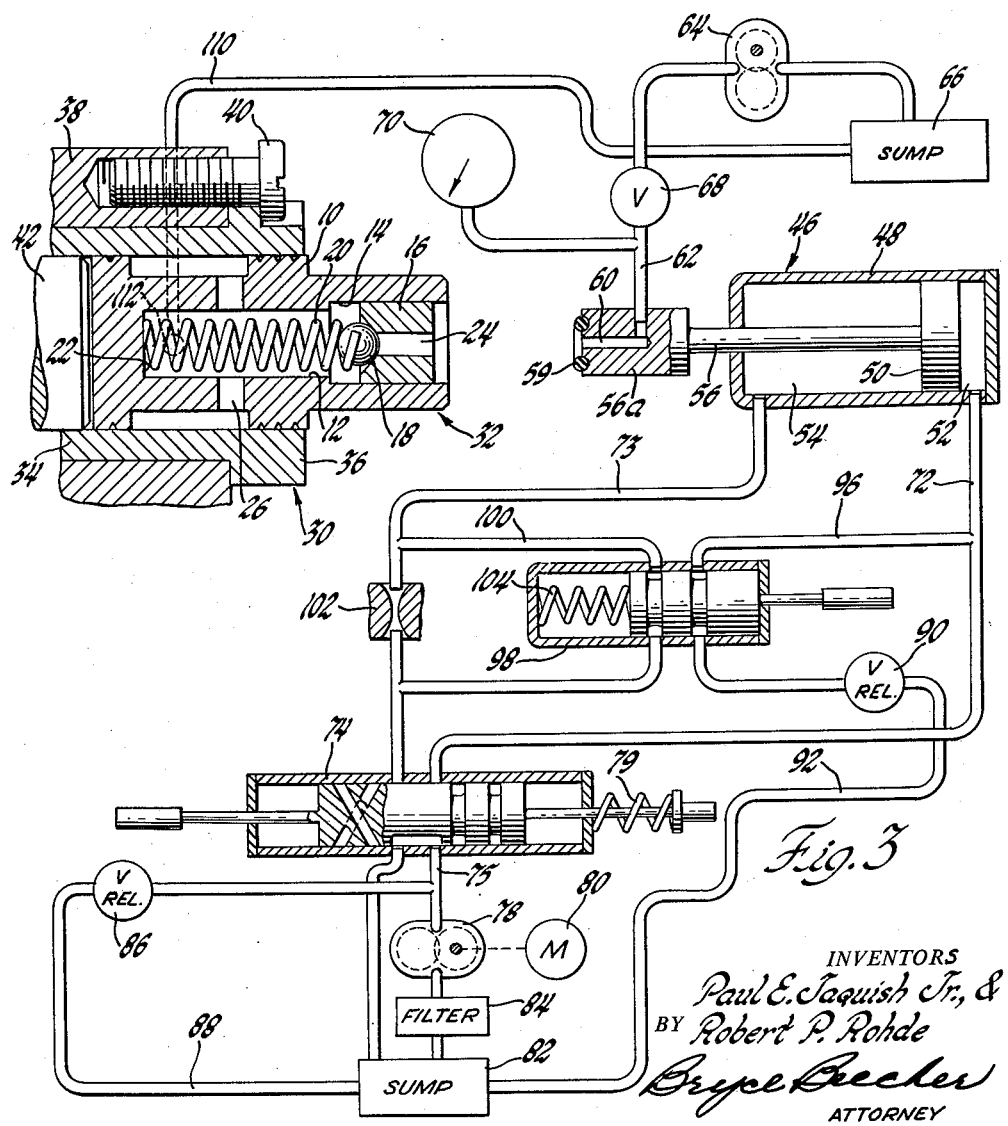
Figure 4:
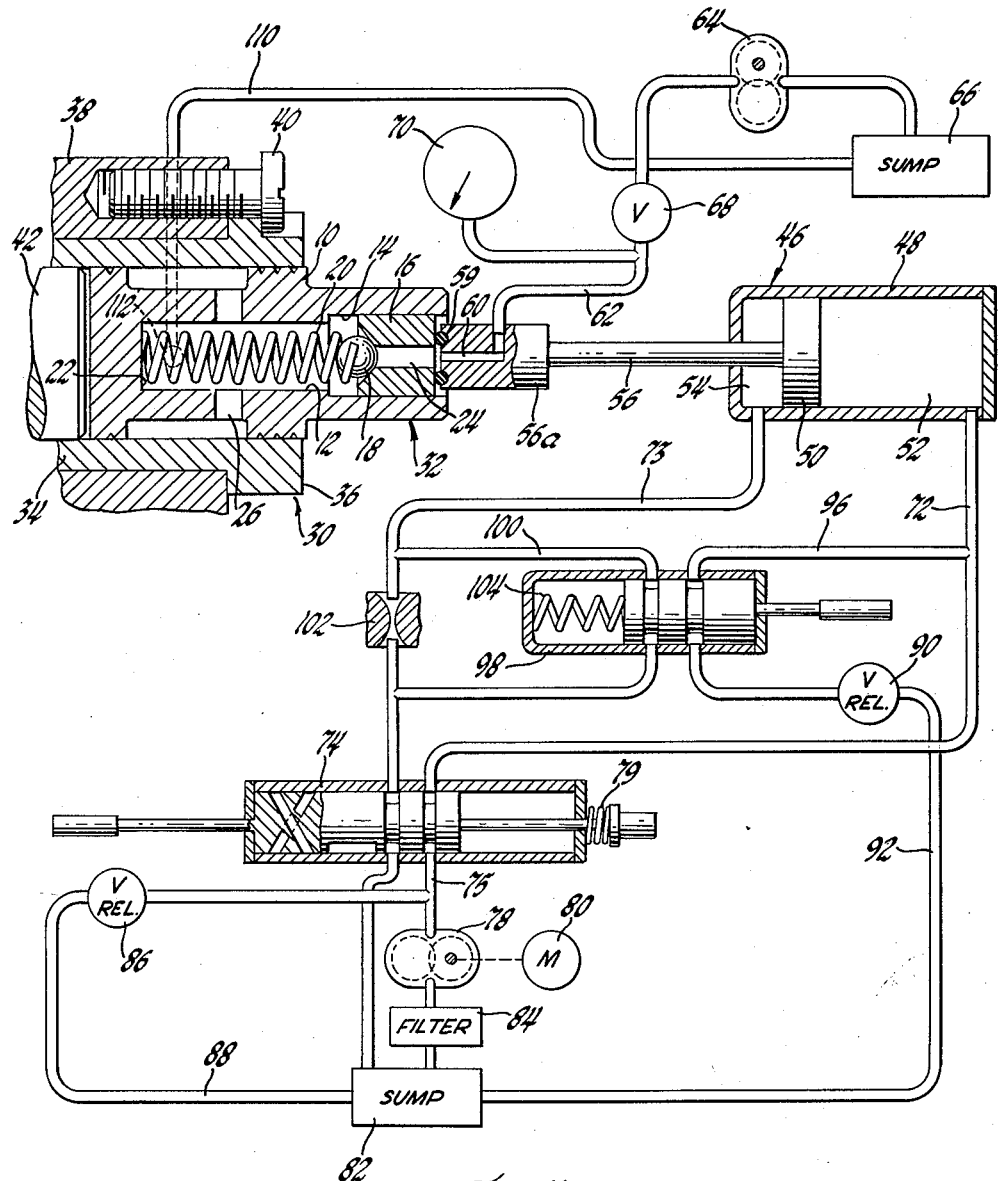
Figure 5:
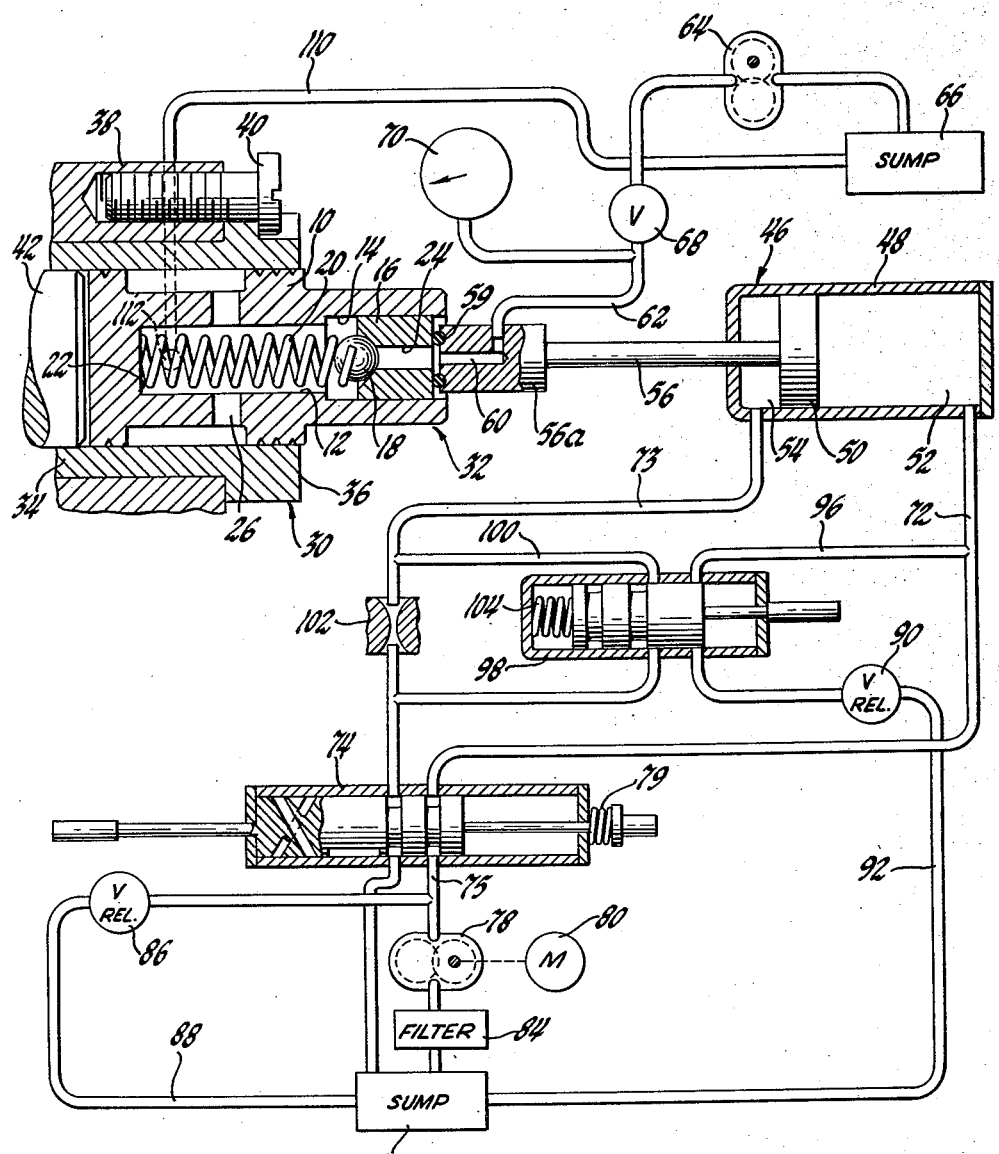
Figure 6:
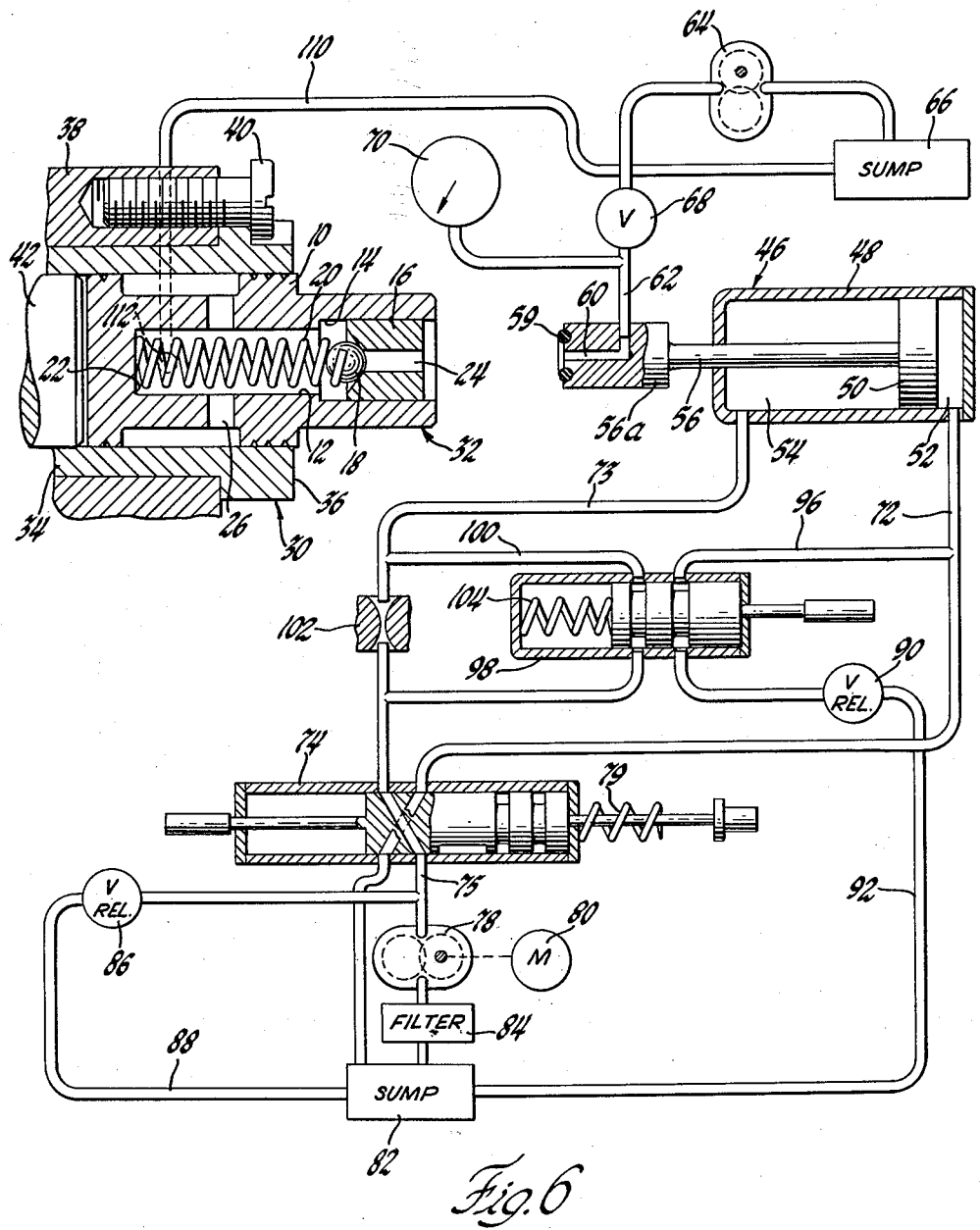

Other objects and features of the invention will be apparent from the following specific description which will proceed with reference to the accompanying drawings wherein:

FIGURE 1 is a longitudinal section of a valve conforming to the invention;
FIGURE 2 is a longitudinal sectional view of a modification;
FIGURE 3 is a diagrammatic representation of a system of apparatus which has been found satisfactory for the purposes of the invention; and
FIGURES 4–6 illustrate the operation of the apparatus.

Referring first to FIGURE 1, the numeral 10 denotes the housing component of the valve. The housing has an axial bore 12 therein open to a counterbore 14 for a plug 16, which is formed to provide a seat for a ball 18. The latter is loaded by a spring 20 reacted by the surface 22.

Plug 16 has therein a passage or port 24 which in use of the relief valve is open to the system served by the valve. When the system pressure exceeds the setting or preloading of the spring 20, ball 18 is displaced leftwardly so that the port 24 becomes open to exhaust passages 26, seen as extending radially of the bore 12.

In accordance with the invention, the plug 16 is press fitted into the counterbore, the extent of its penetration thereinto determining the resistance of the spring 20 to compression from the pressure of the fluid at the port 24.

In FIGURE 2, showing a modification, parts or passages similar to those in FIGURE 1 are denoted by like numerals, the numerals however being primed. Here the element 28, which determines the degree of compression of the spring 20' and hence the resistance of the ball 18' to displacement, does not have the port to the system therein, such port 24' being formed in the housing 10'. Element 28, just as the plug 16 in FIGURE 1, is press fitted into the bore 12' and is desirably formed of a material, a soft aluminum alloy, for example, incapable of distorting the housing 10'.

It should be obvious, considering the press fitting of the plug 16 or the ball 28 into the housing, that no locking means are required; also, that there is no need for the installation of shims to take up excess space.

In accordance with the invention, the plug element 16 or ball element 28 (or equivalent instrumentality) is first lightly pressed into the housing bore to an extent at least sufficient to firmly seat the ball valve. Thereafter the element is gradually forced further into the bore against the resistance of the spring while fluid under pressure is charged through the system port (24, 24'). Once the spring has arrived at the desired degree of compression, as reflected by the pressure required to unseat the element, the force is instantly arrested.

Going now to FIGURE 3 illustrating a form of apparatus suitable for the practice of the invention, there will be seen a fixture 30 for holding the relief valve 32. Such fixture includes an inner sleeve component 34 having a flanged portion 36 and secured to an outer tubular member 38 by means of screws 40, the heads of the screws being accommodated in recesses formed in the flanged portion 36. The valve 32 is positioned axially by means of a locator 42. Since such valve accords with the valve shown in FIGURE 1 the parts are numbered accordingly.

In juxta position to the fixture 30 is a fluid-operated ram 46 comprising a cylinder 48 and a piston 50. The piston delineates what may be called a "working" chamber 52 and a "return" chamber 54 and has extending therefrom a shaft 56, enlarged at 56a. The enlarged portion 56a carries a seal 59 and has therein a passage 60 open to a conduit 62 extending from the discharge side of a pump 64, which draws from a sump or reservoir 66. A valve 68 controls the flow in the conduit 62 while a gauge 70 indicates the fluid pressure therein.

Extending from the ram 46 are conduits 72 and 73 which open, respectively, to working chamber 52 and return chamber 54. These conduits terminate at a control valve 74 biased leftwardly to its shown position by a spring 79. Valve 74 has connection via a line 75 with a pump 78 shown as powered by an electric motor 80, and as drawing from a sump 82 through a filter 84. Line 75 has therein a high pressure relief valve 86 which exhausts via a line 88 to the sump 82.

In addition to the high pressure relief valve 86, the system includes a low pressure relief valve 90 which, like the valve 86, exhausts to the sump 82, a line 92 being provided for this purpose. Relief valve 90 will be noted as connected to the conduit 72 via line 96. Flow to such valve from conduit 72 is controlled by a valve 98, which also controls flow in a bypass line 100 circumventing a variable metering orifice 102 in conduit 73. Valve 98 has associated therewith a spring 104 tending to maintain the valve in its shown position.

To describe now the operation of the apparatus, with the valve 32, which constitutes the work piece, securely locked in the fixture 30, the control valve 74 is displaced leftwardly (FIGURE 4) to admit pressure fluid from the pump 78 to the chamber 52. At this stage, the pressure which may develop in chamber 52 is limited by the low pressure relief valve 90, since valve 98 is in its position permitting flow to the relief valve from conduit 72. And the setting of relief valve 90 is such that this pressure is sufficient only to firmly seat the seal 59 against the face of the plug 16 without causing movement of the plug. Fluid exhausting from the chamber 54, incident to the leftward movement of the piston 50 effecting the firm seating of the seal, is conveyed to the sump 82 via the conduit 73, bypass line 100 and valve 74.

With the foregoing accomplished, valve 68 is opened to admit pressure fluid from pump 64. Since spring 20 is under little pre-load, ball element 18 leaves its seat at a pressure, say, of 300–400 p.s.i., as reflected by the gauge 70. The fluid entering the bore 12 on displacement of the ball element leaves the bore via the radial passages 26 and flows to the sump 66 through line 110, not previously mentioned, which extends from a port 112 formed in the fixture 30.

Following opening of the valve 68, the low pressure relief valve 90 is isolated (FIGURE 5) by shifting valve 98 leftwardly, enabling the development of a pressure in the working chamber 52 sufficient to axially displace the plug 16 against the resistance of the spring 20. Obviously, such movement of the plug must be closely controlled to the end of achieving the exact setting desired, which will be assumed to be 1200 p.s.i. This close control is a function of the metering orifice 102, now effective, bypass line 102 having been closed by the leftward displacement of valve 98. Thus, the rate of movement of the piston 50 is governed by the resistance of the fluid in chamber 54 and the extent of this resistance is determined by the quantity of fluid allowed by the operator to pass the variable orifice to sump 82.

As the plug 16 is gradually pressed into the counterbore 14, the operator watches the gauge 70, which reflects a progressively increasing resistance of the ball 18 to displacement. Once the 1200 p.s.i. relief point is reached, the force holding valve 98 in its displaced position is released and the valve quickly returns to its normal or FIGURE 3 position by the force of spring 104. This activates the low pressure relief valve 90, arresting further movement of the piston 50, and allows fluid to freely exhaust from the return chamber 54 via bypass line 100.

To conclude the operation, the operator moves the control valve 74 rightwardly opening line 73 to pressure and line 72 to exhaust (FIGURE 6). In this way, the piston 50 is restored to its normal or FIGURE 3 position and the apparatus made ready for the setting of another relief valve.

We claim:

Method of assembling and setting a relief valve which comprises providing a body member having a bore therein open to an exhaust passage, said bore being closed at one end, placing a spring in said bore with one end in contact with said closed end, placing a valve element in the bore adjacent the other end of the spring, placing a force moved ram having a fluid pressure supply passage therein into sealing engagement with an abutment also having a passage therein aligned with said supply passage and a seat for the valve element, press fitting said abutment into said bore against the resistance of said spring while delivering fluid pressure against said valve element from said supply passage through said abutment passage in a direction tending to unseat said valve element, and instantly arresting the press fitting force when the spring attains a predetermined degree of compression as reflected by the pressure required to unseat the valve element.

References Cited in the file of this patent

UNITED STATES PATENTS

| | | |
|---|---|---|
| 1,488,365 | Stoakes | Mar. 25, 1924 |
| 1,488,799 | Smith | Apr. 1, 1924 |
| 1,492,237 | Bartalott | Apr. 29, 1924 |
| 2,069,153 | Konkle | Jan. 26, 1937 |
| 2,359,017 | Balsiger | Sept. 26, 1944 |
| 2,587,421 | Willach | Feb. 26, 1952 |
| 2,761,468 | Thatcher | Sept. 4, 1956 |
| 2,888,947 | Montgomery | June 2, 1959 |
| 2,889,616 | Simmons | June 6, 1959 |
| 2,904,877 | Edelen | Sept. 22, 1959 |
| 2,970,467 | Pettibone | Feb. 7, 1961 |

FOREIGN PATENTS

| | | |
|---|---|---|
| 631,889 | Great Britain | Nov. 11, 1949 |